United States Patent
Lohmiller et al.

(10) Patent No.: US 11,238,746 B2
(45) Date of Patent: Feb. 1, 2022

(54) DEVICE FOR CHECKING THE CONSISTENCY OF A POSITIONING

(71) Applicant: AIRBUS DEFENCE AND SPACE GMBH, Taufkirchen (DE)

(72) Inventors: Winfried Lohmiller, Freising (DE); Cristiano Bianchi, Munich (DE); Simon Burns, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 215 days.

(21) Appl. No.: 16/044,844

(22) Filed: Jul. 25, 2018

(65) Prior Publication Data
US 2019/0043373 A1    Feb. 7, 2019

(30) Foreign Application Priority Data

Aug. 2, 2017 (DE) .......................... 102017117501.6

(51) Int. Cl.
*G08G 5/02* (2006.01)
*G08G 5/06* (2006.01)
(Continued)

(52) U.S. Cl.
CPC .............. *G08G 5/025* (2013.01); *G01S 5/021* (2013.01); *G01S 5/06* (2013.01); *G01S 5/14* (2013.01);
(Continued)

(58) Field of Classification Search
CPC ...... G08G 5/025; G08G 5/0065; G08G 5/065; G01S 5/021; G01S 5/06; G01S 5/14; G01S 13/913; G01S 2013/9329
(Continued)

(56) References Cited

U.S. PATENT DOCUMENTS 2,948,892 A * 8/1960 White ................. G01S 13/4445
                                                         342/123
4,103,300 A * 7/1978 Gendreu ............. G01S 13/4472
                                                         342/149
(Continued)

FOREIGN PATENT DOCUMENTS

EP       2237067 B1    10/2010
EP       2402785 B1     1/2012
(Continued)

OTHER PUBLICATIONS

German Patent and Trademark Office, Office Action for German Patent Application No. DE 102017117501.6 dated Apr. 9, 2018.

*Primary Examiner* — Vladimir Magloire
*Assistant Examiner* — Alexander L. Syrkin
(74) *Attorney, Agent, or Firm* — Jenkins, Wilson, Taylor & Hunt, P.A.

(57) ABSTRACT

A device for checking the consistency of a positioning includes: a transmitter, a receiver, a time measuring unit, a distance determining module and a check module. The transmitter emits at least one signal, and the receiver receives at least four response signals from at least four different response elements. A response element receives the at least one signal and, upon receipt, emits a response signal. The time measuring unit determines, for each response signal, a total delay time from a transmission time of the signal and a reception time of the respective signal. The distance determination module determines a distance to the respective response element based on each total delay time, and the check module performs a consistency check of a determination of a position based on distances to the different response elements. With the device, erroneous distance values may be detected in ground-based positioning systems.

9 Claims, 2 Drawing Sheets

(51) Int. Cl.
*G01S 5/06* (2006.01)
*G01S 5/02* (2010.01)
*G01S 5/14* (2006.01)
*G08G 5/00* (2006.01)
*G01S 13/91* (2006.01)
*G01S 13/931* (2020.01)

(52) U.S. Cl.
CPC .......... *G01S 13/913* (2013.01); *G08G 5/0065* (2013.01); *G08G 5/065* (2013.01); *G01S 2013/9329* (2020.01)

(58) Field of Classification Search
USPC .......................................................... 342/33
See application file for complete search history.

(56) References Cited

U.S. PATENT DOCUMENTS

| | | | | |
|---|---|---|---|---|
| 4,283,725 A * | 8/1981 | Chisholm | ................ | G01S 7/40 342/174 |
| 5,241,317 A * | 8/1993 | Howard | ............. | G01S 13/4418 342/149 |
| 5,475,393 A * | 12/1995 | Heinzerling | ............. | G01S 1/14 342/410 |
| 5,483,241 A * | 1/1996 | Waineo | ................ | G01S 13/876 342/125 |
| 5,630,208 A * | 5/1997 | Enge | ...................... | H04B 1/711 375/232 |
| 6,591,171 B1 * | 7/2003 | Ammar | ............... | G01S 13/4463 701/16 |
| 7,750,305 B2 * | 7/2010 | Solf | ....................... | A61B 6/037 250/363.04 |
| 8,576,113 B1 * | 11/2013 | Seah | .................... | G01S 13/913 342/33 |
| 10,677,916 B2 * | 6/2020 | Laplace | .................. | G01S 19/49 |
| 2004/0046687 A1 * | 3/2004 | LaFrey | .................. | G08G 5/025 342/33 |
| 2007/0069942 A1 * | 3/2007 | Hanneman | ............... | G01S 1/14 342/33 |
| 2007/0090993 A1 * | 4/2007 | Arethens | ................ | B64D 45/04 342/357.24 |
| 2009/0276542 A1 * | 11/2009 | Aweya | ..................... | H03L 7/08 709/248 |
| 2012/0242864 A1 * | 9/2012 | Pauli | ....................... | G01S 3/784 348/236 |
| 2012/0280865 A1 * | 11/2012 | Gardner | .................... | G01S 5/14 342/463 |
| 2015/0331099 A1 * | 11/2015 | Wu | ...................... | G08G 5/0008 342/32 |
| 2016/0320493 A1 * | 11/2016 | Wu | ......................... | G01S 19/51 |

FOREIGN PATENT DOCUMENTS

| | | | | |
|---|---|---|---|---|
| FR | 2836554 A1 | 8/2003 | | |
| GB | 2030814 A | * 4/1980 | .......... | G01S 13/781 |
| GB | 2073530 A | * 10/1981 | .......... | G01S 13/781 |
| RU | 2214943 C1 | * 10/2003 | | |
| WO | 2014011264 A2 | 1/2014 | | |

\* cited by examiner

DEVICE FOR CHECKING THE CONSISTENCY OF A POSITIONING

CROSS-REFERENCE TO PRIORITY APPLICATION

This application claims the benefit of, and priority to, German patent application number DE 102017117501.6, filed Aug. 2, 2017. The content of the referenced application is incorporated by reference herein.

TECHNICAL FIELD

Embodiments of the subject matter described herein relate generally to a device for checking the consistency of a positioning.

BACKGROUND

In aviation, positions are determined with tools to ensure safe navigation. The position may be determined in many ways. Thus, among others, satellite-based systems (e.g. GPS or GLONASS) or ground-based systems (for example from patent document WO 2014/011264 A2) are known. If no landmarks on the earth may be detected or detected from the airspace, the aircraft in question depends on obtaining a position as accurate as possible from the said systems. Error-prone signals may falsify the positioning and cause navigation errors.

It is known from patent document EP 2 402 785 B1 for satellite-based systems to use, for example, so-called RAIM (Receiver Autonomous Integrity Monitoring) algorithms, which may detect erroneous signals from satellite-based systems and identify their transmitters. The time signals transmitted by the satellites to a receiver on the ground or in the air above the earth are evaluated by statistical methods against each other to check their consistency in this way.

For ground-based systems that rely on the aerial vehicle emitting a signal that is answered by ground-based receivers, and based on which distances to the receivers are calculated, nowadays faulty signals are neither detected nor their transmitters identified.

BRIEF SUMMARY

Therefore, it is the object of the disclosure to provide an apparatus and a method with which erroneous distance values may be detected in ground-based positioning systems.

The object is solved by the features of the independent claims. Advantageous developments are the subject of the dependent claims and the following description.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following, an exemplary embodiment of the invention will be described with reference to the drawings.

DETAILED DESCRIPTION

Figure 1:
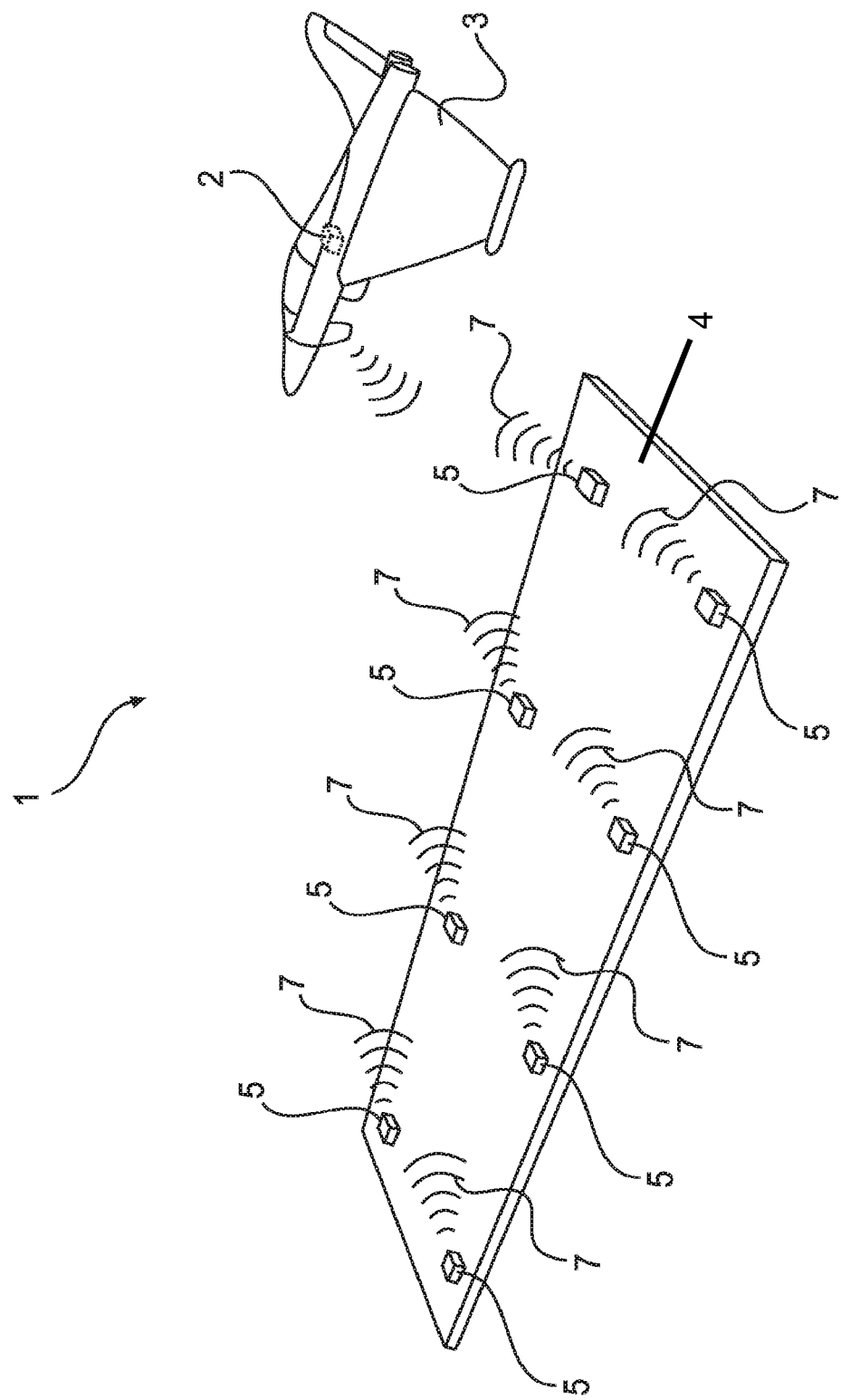
FIG. 1 shows a schematic drawing of a system for checking the consistency of a positioning.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the invention relate to a device for checking the consistency of a positioning, the device having a transmitting device, a receiving device, a time-measuring unit, a distance determination module and a check module; wherein the transmitting device transmits at least one signal; wherein the receiving device receives at least four response signals from at least four different response elements, wherein a response element receives the at least one signal and transmits a response signal upon receipt of the at least one signal; wherein the time measuring unit determines, for each received response signal, a total delay time from a transmission time of the signal and a reception time of the respective response signal, the distance determination module determining a distance to the respective response element based on each total delay time, and wherein the check module performs a consistency check of a positioning based on distances to the at least four different response elements.

An exemplary embodiment of the invention provides, by means of the transmitting device and the receiving device, four different response signals from ground-based response elements to determine from the time intervals between the transmission of the signal with the transmitting device and the reception of the four response signals, the respective distance to the response elements. This is done by means of the time measuring unit and the distance determining module, wherein the speed of the signals and response signals and the time duration between the reception of the signal from the response element and the transmission of the response signal by the response element is known. For electromagnetic signals and response signals, e.g. radar signals, the speed is the speed of light in air. The check module now determines a position based on the at least four distances. Since only three distances to three different points are required for a positioning in three-dimensional space, a check may be made by means of the fourth and thus redundant distance whether the positioning is consistent. It uses redundant distance measurements to check the consistency of all distance measurements. For the first time, this makes it possible to carry out a consistency check for ground-based positioning systems, which detects the presence of incorrect distance values in ground-based positioning systems. The check module advantageously performs the consistency check based on distances to at least five different response elements. With at least five different distances, it is possible to identify a faulty response element or a faulty distance and therefore to not consider it. Thus, for a faulty distance value, at least two determined positions that are based on at least three of the five distance values match. Thus, the consistency check may be improved to such an extent that erroneous response signals are identified and not considered when determining the position. Thus, the accuracy of positioning may be improved with a ground-based positioning system.

Advantageously, the check module performs the consistency check by determining a position based on all distances and checking each distance.

By using all the distances in the determination of the position, a single position is first determined, which deviates only slightly from the true position in the presence of a faulty response signal. Then, a check of each individual response signal may be made to check the consistency of the individual distances with respect to the particular position.

Further, it is advantageous if the check module performs the consistency check with a determination of the number N of all distances and the determination of a position by means of an integrity position of a plurality of, preferably of all, positions based on N−1 distances.

In this case, all but one distance is used for a first positioning. In the second determination of a position, another distance is omitted. The positioning is repeated for all distances. Each determined position is subject to a certain inaccuracy, so that no spatial point, but rather a small volume of space is a position output. If all positions match, no response element is defective. If the positions deviate from each other, at least one of the response elements used for the positioning is defective. Since it is not initially identified which of the response elements is defective, an integrity position is determined from the union of the spatial volumes of all determined positions, since at least one of the determined positions must be correct. By combining the unidentifiable correct position value with the unidentifiable wrong position values, at least a high integrity in determining the integrity position is achieved since the integrity position overlaps the correct position.

It is expedient if the check module has a time filter element, preferably a Kalman filter bank, which performs temporal filtering in the determination of a total delay time.

This increases the accuracy of the measurements of the time intervals between the transmission of the signal by the transmitting device and the reception of the response signals by the receiving device.

Advantageously, the transmitting device transmits at least two signals, wherein one of the at least two signals is an altitude radar output signal, and wherein the receiving device receives at least one altitude radar input signal as one of the four response signals.

With the use of the altitude radar output signal and the altitude radar input signal, the altitude measurement may be additionally used for the consistency check, since the altitude measurement also provides a distance measurement. The response element in the altitude radar signal measurement is the ground itself, which returns a reflected signal as a response signal in response to an incoming signal from the transmitting device.

The disclosure further relates to a system for checking the consistency of a positioning, wherein the system has at least four response elements, an aircraft, and at least one device according to the preceding description, wherein the at least four response elements emit a response signal after receiving a signal of the device, and wherein the device is connected to the aircraft.

With the system, the position of aircrafts performing their positioning using ground-based systems, in which case the ground-based systems are the response elements, may be accurately calculated and the consistency of the measured distances to the response elements may be checked. This increases the safety of the aircraft, as accurate positioning allows for more accurate navigation.

Advantageously, the at least four response elements are designed as a reflector, beacon, repeater, or transponder.

Advantageously, the system has a, preferably floating, platform, wherein the at least four response elements are connected to the platform.

The positions of response elements that are on a floating platform are continually changing due to the waves. Further, a movement of the floating platform may change the position of the response elements. In accordance with the disclosed embodiments of the invention, an exact position may also be determined with response elements which are subject to positional fluctuations. The consistency check may further determine the exact position of the aircraft so that the relative position of the aircraft to the floating platform is e.g. may be determined very accurately during a landing maneuver.

Furthermore, the disclosure relates to a method for checking the consistency of a positioning with the steps: a) transmitting a signal with a transmitting device; b) receiving at least four response signals from at least four different response elements by means of a receiving device, wherein a response element receives the signal and emits a response signal upon receipt of the signal; c) determining a total delay time for each received response signal from a time of transmission of the signal and a time of receipt of the respective response signal with a time measurement unit; d) determining a distance based on each total delay time to the respective response element with a distance determination module, and e) checking a consistency of the distances with a consistency check by means of the determination of a position based on distances to the at least four different response elements with a check module.

Advantageously, the method is used in a landing maneuver, or a takeoff maneuver, or taxiing of an aircraft.

Precisely in landing or takeoff maneuvers of an aircraft, an accurate positioning is advantageous to avoid collisions with objects located close to the ground or objects protruding from the ground.

Referring to the figures, the system for checking the consistency of a positioning is referred to in its entirety by the reference numeral 1, hereinafter, as shown in FIG. 1.

The system 1 comprises an aircraft 3 in which a device 2 for checking the consistency of a positioning is arranged and connected to the aircraft 3. Further, the system 1 comprises response elements 5 mounted on a platform 4.

FIG. 1 shows a landing maneuver of the aircraft 3. A signal 6 is emitted by the device 2. The signal 6 is received by the response elements 5. The response elements 5 then send out response signals 7. These response signals 7 may be received by the device 2.

Figure 2:
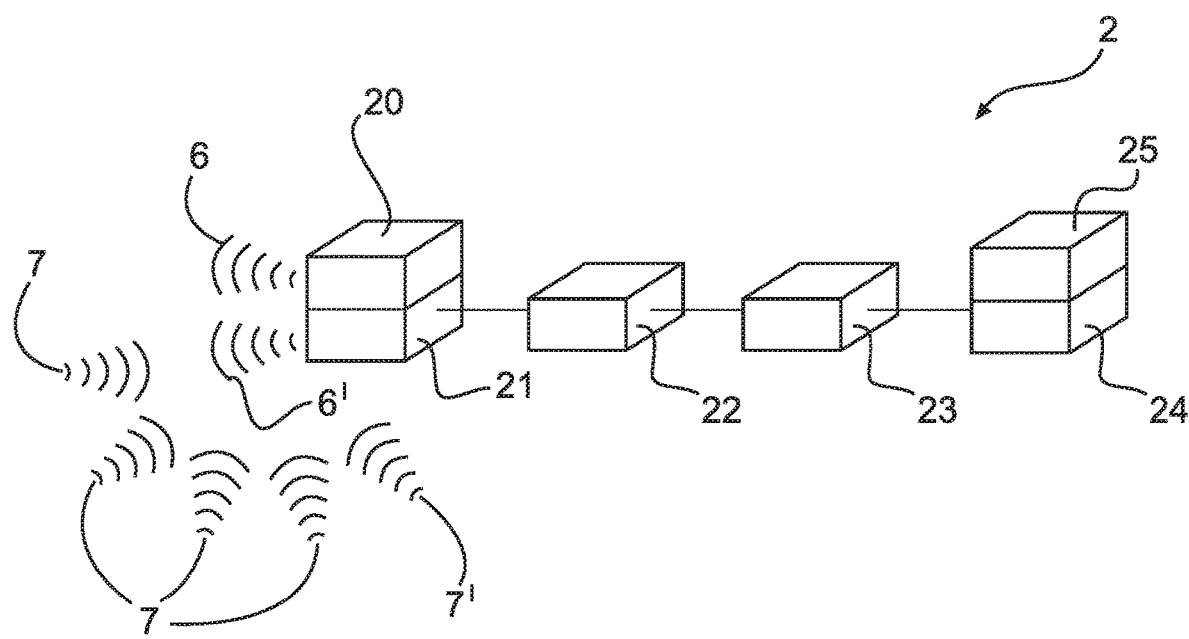
FIG. 2 shows a schematic drawing of a device for checking the consistency of a positioning.

The device 2 is described in more detail in FIG. 2. The device 2 comprises a transmitting device 20, a receiving device 21, a time measuring unit 22, a distance determination module 23, a check module 24, and a filter unit 25.

The transmitting device 20 transmits at least one signal 6. The transmitting device 20 may include several elements that are able to send signals. In this case, the transmitting device 20 may also emit a signal 6', which may be an altitude radar output signal.

The signals 6 are received by response elements 5. The response elements 5 are configured to emit a response signal 7 when they receive a signal 6. In this case, the response element 7 may be a reflector and the response signal 7 may be a reflected signal. Alternatively or additionally, the response signal 7 may be a separate signal from a response element 5 e.g. a beacon, a transponder, or a repeater, the signal being emitted by the response element 5 in response to the receipt of the signal 6.

In the case of signal 6', which may be an altitude radar output signal, the altitude radar output signal is reflected from the earth's surface. In this case, the earth's surface is the response element 5 and the signal reflected by the earth's surface is the response signal 7' or the altitude radar input signal.

The receiving device 21 receives the response signals 7, 7'. In this case, the receiving device 21 receives at least four response signals 7, 7'. The receiving device 21 thus receives a redundant number of response signals 5 for a three-dimensional positioning. The receiving device 21 may also include a plurality of components, each of which may receive signals for itself. Thus, a portion of the receiving device 21 may be configured to receive only altitude radar input signals.

The time measuring unit 22 determines the duration between the transmission of the signal 6 or 6' and the reception of a response signal 7 or 7'.

In this case, the time measuring unit 22 may also determine the duration between the transmission of the altitude radar output signal and the reception of the altitude radar input signal.

The distance determination module 23 determines the distance between the respective response element 5 and the device 2 using the measured durations. Here, the distance determination module 23 uses the speed of light to calculate the distance from the measured time traveled by the signal 6, 6' and the response signal 7, 7'. Further, the distance determination module 23 considers the duration that elapses between the reception of the signal 6, 6' and the transmission of the response signal 7, 7'. Thus, the distance determination module 23 may determine the distance of the device 2 to a response element 5.

The distance determination module 23 determines from the at least four response signals 7, 7' at least four different distances to different response elements 5.

With at least four different distances, the check module 24 determines the position of the aircraft 3. With the at least four different distances, the check module 24 may check the consistency of the four distances so far that it may be determined whether one of the four response elements 5 belonging to the distances was faulty, i.e. whether e.g. a response element 5 has sent a response signal 7 after receiving the signal 6 with a long delay. In a delayed transmission of a response signal 7 by a response element 5, the duration between the transmission of the signal 6 and the reception of the response signal 7 of the respective response element 5 would be too long. Therefore, the distance determination module would determine a distance to the respective response element 5 being too large. With at least four response signals 7, 7', the check module 24 may recognize this fact. However, four response signals 7, 7' are insufficient to identify the faulty response element 5. For this purpose, the check module 24 requires at least five different distances, so that the receiving device 21 must receive at least five response signals 7, 7' from five different response elements 5. In this case, a filter unit 25, which may be a Kalman filter bank, performs time filtering on the check module 24 to improve the accuracy of the time measurement.

In a first embodiment, the check module 24 determines the position based on all distances to the response elements 5. To check the consistency, a check of each individual distance to a response element 5 is performed, then.

In a second alternative or additional embodiment, the check module 24 first determines the number N of available distances to the response elements 5. Then, the check module 24 determines a position from N−1 distances, ignoring the Nth distance. The check module 24 repeats this, wherein each distance is disregarded in one of the repetitions. If all distances have been determined correctly, all determined positions will be identical. If one of the distances should not be correct, at least one of the determined positions is correct. However, it is not known which position is correct. Therefore, an integrity position is determined from all N determined positions, wherein the integrity position represents an overlap area of the positions consisting of spatial volumes. This integrity position also includes portions of the volume of the correct position and may therefore be used for positioning.

Figure 3:
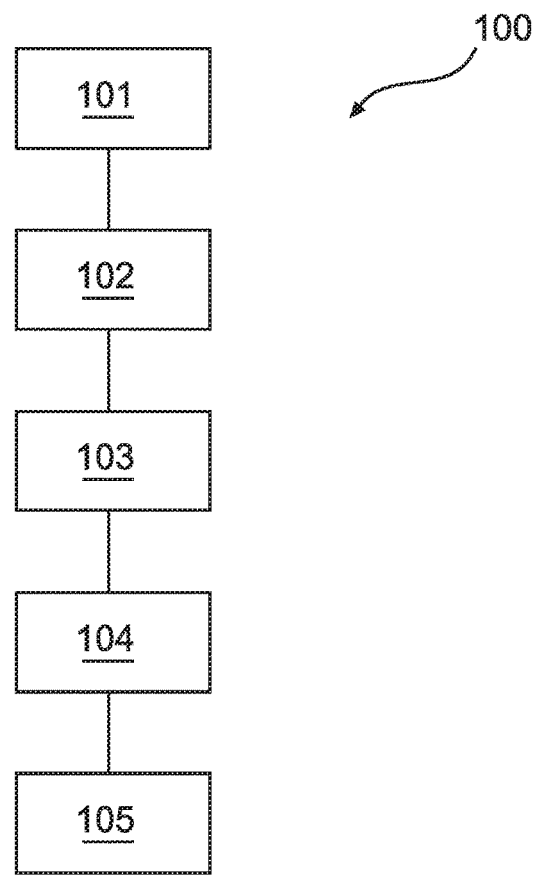
FIG. 3 shows a schematic flow diagram of a method for checking the consistency of a positioning.

FIG. 3 shows a method 100 for checking the consistency of a positioning based on a schematic flow chart.

In a first step 101, a signal is transmitted with a transmitting device. The transmitting device 20 in this case emits at least one signal 6. The transmitting device 20 may include several elements that are able to send signals. In this case, the transmitting device 20 may also emit a signal 6', which may be an altitude radar output signal.

The response elements 5 receive the signals 6. The response elements 5 are configured to emit a response signal 7 when they receive a signal 6. In this case, the response element 5 may be a reflector and the response signal 7 may also be a reflected signal. Alternatively or additionally, the response signal 7 may be a separate signal from a beacon, a transponder or a repeater as a response element 5, which is emitted by the response element 5 in response to the receipt of the signal 6.

In the case of signal 6', which may be an altitude radar output signal, the altitude radar output signal is reflected from the earth's surface. In this case, the earth's surface is the response element 5 and the signal reflected by the earth's surface is the response signal 7' or the altitude radar input signal.

In a second step 102, at least four response signals from at least four different response elements are received by means of a receiving device. The receiving device 21 receives the response signals 7, 7'. In this case, the receiving device 21 receives at least four response signals 7, 7'. The receiving device 21 thus receives a redundant number of response signals 5 for a three-dimensional positioning. The receiving device 21 may also include a plurality of components, each of which may receive signals for itself. Thus, a portion of the receiving device 21 may be configured to receive only altitude radar input signals.

In a third step 103, the total delay is determined for each received response signal from a transmission time of the signal 6, 6' and a reception time of the respective response signal 7, 7' a time measuring unit. The time measuring unit 22 determines the duration between the transmission of the signal 6 or 6' and the reception of a response signal 7 or 7'.

In this case, the time measuring unit 22 may also determine the duration between the transmission of the altitude radar output signals and the reception of the altitude radar input signals.

In a fourth step 104, a distance is determined based on the total delay times of the signals and response signals to the respective response element by means of a distance determination module. The distance determination module 23 determines the distance between the respective response element 5 and the device 2 using the measured durations. The distance determination module 23 uses the speed of light to calculate the distance from the measured period traveled by the signal 6, 6' and the response signal 7, 7'. Further, the distance determination module 23 considers the duration that elapses between the reception of the signal 6, 6' and the transmission of the response signal 7, 7'. Thus, the distance determination module 23 may determine the distance of the device 2 to a response element 5.

The distance determination module 23 determines at least four different distances to different response elements 5 from the at least four response signals 7, 7'.

In a fifth step 105, the consistency of the distances is checked with a consistency check by means of a positioning based on the distances to at least four different response elements by means of a check module. With the at least four different distances, the check module 24 determines the position of the aircraft 3. With the at least four different distances, the check module 24 may check the consistency of the four distances so far that it may be determined whether one of the four response elements 5 belonging to the distances was faulty, i.e. whether e.g. a response element 5 has sent a response signal 7 after receiving the signal 6 with a long delay. In a delayed transmission of a response signal 7 by a response element 5, the duration between the transmission of the signal 6 and the reception of the response signal 7 of the respective response element 5 would be too long. Therefore, the distance determination module would determine a distance to the respective response element 5 being too large. With at least four response signals 7, 7', the check module 24 may recognize this fact. However, four response signals 7, 7' are insufficient to identify the faulty response element 5. For this purpose, the check module 24 requires at least five different distances, so that the receiving device 21 must receive at least five response signals 7, 7' from five different response elements 5. In this case, a filter unit 25, which may be a Kalman filter bank, performs time filtering on the check module 24 to improve the accuracy of the time measurement.

In a first embodiment, the check module 24 determines the position based on all distances to the response elements 5. To check the consistency then a check of each individual distance to a response element 5 is performed.

In a second alternative or additional embodiment, the check module 24 first determines the number N of available distances to the response elements 5. Then, the check module 24 determines a position from N−1 distances, ignoring the Nth distance. The check module 24 repeats this, wherein each distance is disregarded in one of the repetitions. If all distances have been determined correctly, all determined positions will be identical. If one of the distances should not be correct, at least one of the determined positions is correct. However, it is not known which position is correct. Therefore, an integrity position is determined from all N determined positions, wherein the integrity position represents an overlap area of the positions consisting of spatial volumes. This integrity position also includes portions of the volume of the correct position and may therefore be used for positioning.

The method 100 described above is preferably used in a landing maneuver or a takeoff maneuver or in the taxiing of an aircraft. This makes it possible to ensure that the aircraft may determine its own position relative to the response elements even if the landmarks are not visible or missing.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device configured for checking a consistency of a positioning, the device comprising:
   a transmitting device;
   a receiving device;
   a time measuring unit;
   a distance determination module; and
   a check module;
   wherein the transmitting device is configured to emit at least one signal;
   wherein the receiving device is configured to receive at least four response signals from at least four different response elements;
   wherein a response element is configured to receive the at least one signal and, upon receipt of the at least one signal, the response element is configured to emit a response signal;
   wherein the time measuring unit is configured to determine, for each received response signal, a total delay time from a transmission time of the signal and a reception time of the respective response signal;
   wherein the distance determination module is configured to determine a distance to the respective response element based on each total delay time;
   wherein the check module is configured to perform a consistency check of a determination of a position based on distances to the at least four different response elements;
   wherein the check module is configured to perform the consistency check with a determination of a number N of all distances and the determination of a position by way of an integrity position of a plurality of N−1 distances, wherein the check module is configured to ignore the Nth distance; and
   wherein the check module comprises a time filter element is configured to perform a temporal filtering in determining the total delay time for each received response signal.

2. The device of claim 1, wherein the check module is configured to perform the consistency check based on distances to at least five different response elements.

3. The device of claim 1, wherein the check module is configured to perform the consistency check by way of the determination of a position based on all distances and a check of each distance.

4. The device of claim 1, wherein:
   the transmitting device is configured to emit at least two signals;
   wherein one of the at least two signals is an altitude radar output signal; and
   the receiving device is configured to receive at least one altitude radar input signal as one of the four response signals.

5. A system for checking the consistency of a positioning, the system comprising:
   at least four response elements;
   an aircraft; and a device according to claim 1, wherein the device is connected to the aircraft;

wherein the at least four response elements are configured to emit a response signal upon receipt of a signal of the device.

6. The system of claim 5, wherein the at least four response elements are configured to be a reflector, a beacon, a repeater or a transponder.

7. The system of claim 5, further comprising a floating platform, the at least four response elements being connected to the floating platform.

8. A method for checking a consistency of a positioning, the method comprising:

transmitting a signal with a transmitting device;

receiving at least four response signals from at least four different response elements by way of a receiving device, wherein a response element receives the signal and transmits a response signal upon receipt of the signal;

determining a total delay time for each received response signal from a transmission time of the signal and a reception time of the respective response signal with a time measurement unit;

determining a distance based on each total delay time to the respective response element with a distance determination module; and checking a consistency of the distances with a consistency check by way of the determination of a position based on distances to the at least four different response elements with a check module;

wherein checking the consistency of the distances further comprises checking the consistency of the distances with a determination of a number N of all distances and the determination of a position by way of an integrity position of a plurality of N−1 distances, wherein the check module is configured to ignore the Nth distance; and wherein checking the consistency of the distances comprises performing a temporal filtering in determining the total delay time for each received response signal.

9. The method of claim 8, wherein the method is used in a landing maneuver or a takeoff maneuver or taxiing of an aircraft.

\* \* \* \* \*